United States Patent [19]

Shiraki et al.

[11] Patent Number: 4,698,535
[45] Date of Patent: Oct. 6, 1987

[54] ELECTRIC MOTOR OPERATED THROTTLE VALVE

[75] Inventors: Manabu Shiraki, Yamato; Hiroyuki Amano, Kariya; Tomoaki Nishimura; Katsumasa Shimizu, both of Toyoake, all of Japan

[73] Assignee: Aisin Seiki Kabushiki Kaisha, Aichi, Japan

[21] Appl. No.: 847,789

[22] Filed: Apr. 3, 1986

[30] Foreign Application Priority Data

Apr. 4, 1985 [JP] Japan .............................. 60-50284[U]

[51] Int. Cl.⁴ ..................... H02K 21/14; F02D 11/10; B60K 31/04
[52] U.S. Cl. .................................... 310/156; 123/337; 123/361; 335/272
[58] Field of Search .................. 123/337, 361; 310/36, 310/38, 39, 156, 268; 335/222, 272

[56] References Cited

U.S. PATENT DOCUMENTS 4,409,940 10/1983 Gaus ................................... 123/337
4,504,770 3/1985 Burkel et al. ........................ 335/272
4,551,645 11/1985 Takahashi et al. .................. 310/156

FOREIGN PATENT DOCUMENTS 153945 9/1984 Japan .................................. 123/361

Primary Examiner—Patrick R. Salce
Assistant Examiner—D. L. Rebsch
Attorney, Agent, or Firm—Sughrue, Mion, Zinn, Macpeak & Seas

[57] ABSTRACT

A disk-shaped and coreless type electric motor for controlling the tilt of a throttle valve. The motor includes a field magnet having at least one pair of N and S poles and a stator armature having at least one set of coils disposed in face-to-face confronting relation to the magnet. The shaft of the motor is coupled directly to the shaft carrying the throttle valve, the latter shaft being urged by a spring toward a position where the valve throttles off the passage of air. The coil is so positioned relatively to the N and S poles of the magnet that when the coil is excited, any conductor portions thereof can act effectively to develop torque to rotate the magnet.

4 Claims, 3 Drawing Figures

ELECTRIC MOTOR OPERATED THROTTLE VALVE

FIELD OF THE INVENTION

The present invention relates to an electric motor. More specifically, it relates to an apparatus for driving a throttle valve for use in an automotive internal combustion engine and controling the tilt thereof.

BACKGROUND OF THE INVENTION

Apparatus for controlling the tilt of a throttle valve adapted for use in an automotive internal combustion engine by means of an electrical device such as a motor can make possible adjustment of the throttle valve in response not only to the operation of the accelerator pedal in the driver's compartment, but also to various factors, e.g., varying conditions of an engine. Thus, such an apparatus can offer a wide range of application opportunities in designing automotive engines.

One such apparatus for controlling the throttle valve is disclosed by laid-open Japanese Patent Application No. 58-13135 (1983), wherein a throttle valve is connected to a control lever which is in turn connected operatively by way of a reduction gearing to an electric motor, and a spring is provided in such a way to urge the valve toward its "closed" or "throttling" position. The motor, when energized, causes the throttle valve to tilt for controlling the opening of an air passage in which the valve is tiltably mounted. With such an arrangement of the apparatus, in the event of failure of power supply to the motor for any reason, it will be brought to a stop at a position where the supply of power is shut off. Though the spring then acts on the throttle valve to return it to its original position, the motor itself will offer substantial resistance against the action of the return spring. Additional resistance is offered by the reduction gearing which is connected to the valve control lever. In this way, the apparatus according to the prior art has a drawback in that the throttle valve will be substantially locked in its "opened" position if power to the motor is turned off. In other words, the throttle valve should preferably be brought back to its "throttling" position as soon as the motor is de-energized.

In view of the requirement that the throttle valve in operation only has to tilt or turn through an angle of about 90 degrees, an ordinary motor of any known type, if used for tilt adjustment of the valve, will have more component parts than necessary for the desired controlling. An apparatus for controlling the throttle valve designed for use, e.g., in an automobile, is required to operate with a quick response and the motor therefor should preferably be a DC motor. Furthermore, it should be as compact as possible to economize space, and a brushless type is desirable to enable prolonged periods of serviceable life, trouble-free operation and ease of maintenance.

SUMMARY OF THE INVENTION

Therefore, it is an object of the present invention to provide an electric motor adapted for controlling the tilt of a throttle valve, which can allow the valve to return to its "throttling" position automatically when power to the motor is shut off.

Another object of the invention is to provide a motor which can dispense with a device for detecting the changes of magnetic poles, such as a Hall device that has been necessary for conventional brushless motors, so as to simplify the motor construction and to reduce the cost thereof.

Still another object of the invention is to provide a disk type motor which can be made advantageously thin without use of any current distributing means such as commutators and brushes, for ease of maintenance and prolonged periods of serviceable life.

The apparatus for controlling the tilt of a throttle valve constructed in accordance with the present invention includes a spring which acts in a direction which causes the throttle valve to tilt to its "throttling" position, and a drive motor including a field magnet having at least one pair of N and S poles and carried by a rotary shaft which in turn supports the throttle valve, and a stator armature disposed in face-to-face relation to said field magnet and having at least one conductor winding.

By arranging the motor in the above fashion, it can be directly coupled to the rotary shaft supporting the throttle valve, thus doing away with a reduction gearing which, if provided, offers resistance when moving the throttle valve back to its original "closed" position. Furthermore, because the motor dispenses with a brush, the torque necessary for starting the motor can be reduced greatly and no resistance will occur due to sliding friction of a brush. In this way, the result is that, in the event that the motor is de-energized, the throttle valve can be returned to its original "throttling" position smoothly under the influence of the return spring.

Furthermore, because the brushless motor constructed in accordance with the invention calls for no device for detecting the magnetic pole changes, such as a Hall device, it can be made simpler, hence less costly and less susceptible to troubles.

These and other objects, advantages and features of the present invention will become apparent by reference to the following description taken in conjunction with the accompanying drawings.

DETAILED DESCRIPTION OF PREFERRED EMBODIMENT

Figure 1:
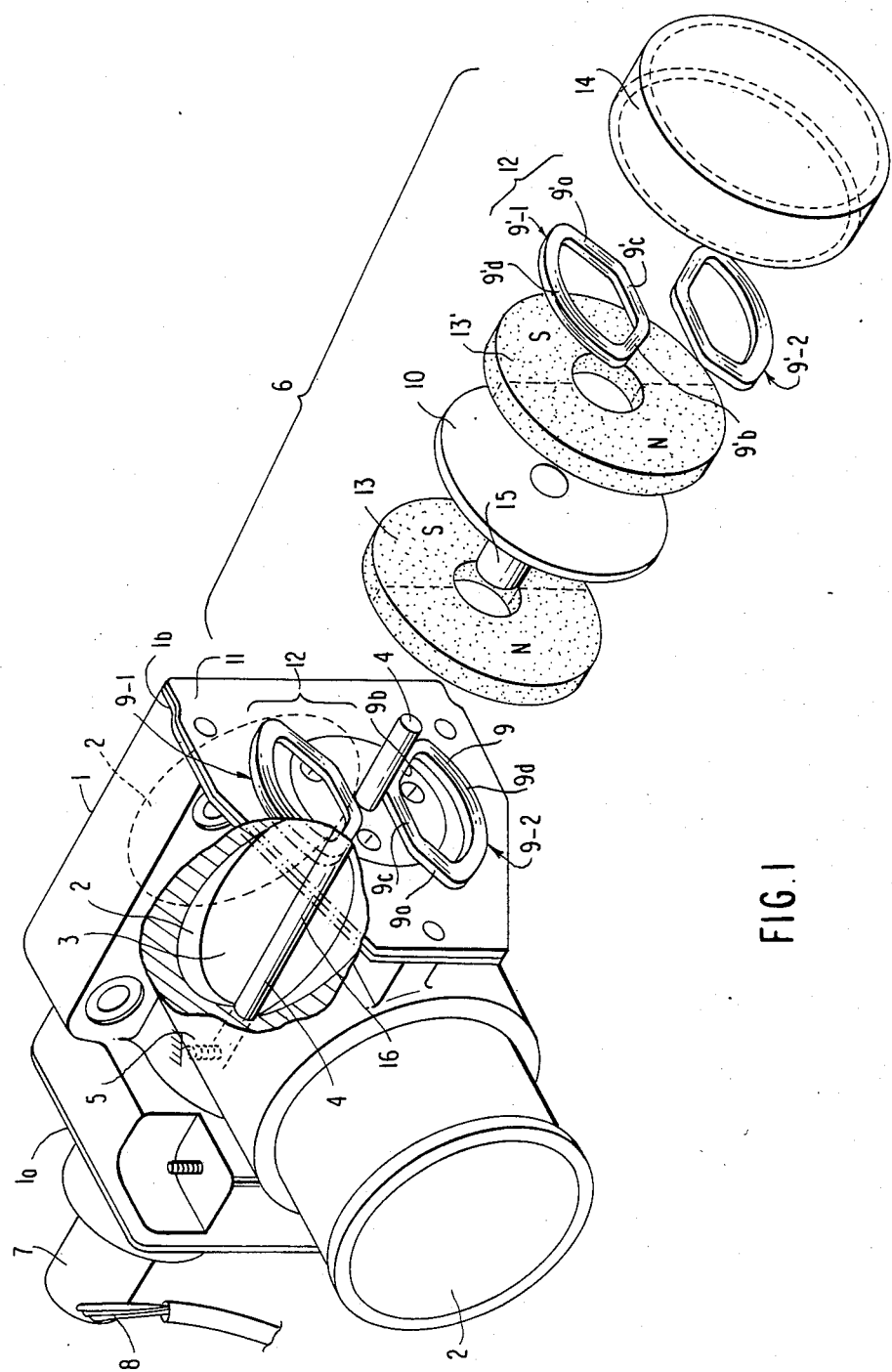
FIG. 1 is a perspective view, partly exploded and broken, showing a preferred embodiment of the apparatus constructed in accordance with the present invention.

Referring to FIG. 1, a throttle valve body shown generally by a reference numeral 1 has a cylindrical air passage 2 formed therethrough. In the air passage 2, a throttle valve 3 in the form of a circular disk which closes the passage 2, or throttles the air flowing therethrough, is supported by a rotary shaft 4 extending perpendicularly to the central axis of the air passage. The throttle valve 3 thus supported by the shaft 4 is placed normally under the influence of a spring 5 which acts on the shaft in such a way that the throttle valve may be tilted to close the air passage 2. In operation of the apparatus, the throttle valve 3 is driven to rotate by a drive, or a motor 6 which is to be described in detail below, by way of the shaft 4, in such a way as to adjust the tilt of the valve for adjusting the opening of the air passage 2, hence the flow of air passing therethrough.

As shown in FIG. 1, the rotary shaft 4 is secured to the throttle valve at its diametral bisector line of the circular disk of the valve by a fastening member 16 so that the shaft is rotated integrally with the valve. The shaft 4 is journalled at its opposite ends by any suitable bearing means (not shown) mounted in the throttle valve body 1, with the extension from one end of the shaft connected to a rotary shaft (not shown) of a valve tilt detecting device 7 which is fixedly mounted to a lateral side 1a of the valve body 1. Alternatively, the rotary shaft 4 carrying the throttle valve 3 and the counterpart of the detecting device 7 may share a single common shaft. The tilt detector 7 includes a potentiometer, tachogenerator, encoder or any other suitable means which is adapted to produce and transmit through leads 8 a signal representing the degree of tilt of the throttle valve 3 then positioned, or the current opening of the air passage 2. The signal is transmitted to a control circuit for the motor 6 so that energizing of armature coils 9-1, 9-2, 9'-1 and 9'-2 of the motor may be adjusted according to the control signal, to control the tilt of the throttle valve 3.

The other end of the rotary shaft 4 opposite to the counterpart connected to the shaft of the valve tilt detector 7 is extended through the motor 6 to be utilized as a common shaft. Lateral side 1b of the throttle valve body 1 adjacent to the motor 6 has a stator yoke 11 of magnetic material attached thereto, and the surface of this stator yoke 11 is properly insulated. It is preferable that the surface should be formed with a printed circuit having the desired wiring pattern by using etching or any other convenient methods.

As shown in FIG. 1, in particular its exploded portion, an assembly of the aforementioned valve drive motor 6 is fastened onto the surface of the stator yoke 11 on the lateral surface 1b of the body 1, the major component parts of the motor 6 including a first stator armature 12, a second stator armature 12', an extension of the rotary shaft 4, field magnets 13 and 13', a rotor yoke 10, and a housing 14.

The first stator armature 12 has two coreless and flatshaped coils, or conductor windings, 9-1, 9-2 which are fixed onto the surface of stator yoke 11 in such an arrangement that one 9-1 is located above the other 9-2 in a symmetrical fashion with no portion overlapped therebetween. Though each of the illustrated coreless coils 9-1 and 9-2 is made of a number of turns of conductors formed into a shape similar to an outer framework of a fan, it may be made in the form of a printed coil by etching of conductor foils or any other convenient methods. Furthermore, the coil may be shaped otherwise than the above-said fan shape. However, since the motor 6 only has to tilt the throttle valve 3 through about 90 degrees, it is preferable that the armature coils 9-1, 9-2 should be fan-shaped with their effective conductor portions 9a, 9b, or portions substantially effective for the development of output torque of the motor, formed such that their included angle may be about 90 degrees. It is to be noted that the above angle should not be limited to about 90 degrees, but it may be formed more than that, but less than 180 degrees. Incidentally, conductor portions 9c, 9d of the armature coils 9-1, 9-2 contribute little to the development of torque of the motor 6. The armature coils 9-1, 9-2 illustrated in FIG. 1 are shown as coreless type for a reduction of manufacturing cost, but an iron core may be provided either inside or outside the coil when development of a greater torque is an important design consideration, even at a cost of disadvantages such as cogging, energy loss due to iron core, poor response, etc. An iron core, when employed inside the armature coil, should preferably be formed with an included angle corresponding to the above-mentioned angle of about 90 degrees of coils 9-1, 9-2 of the stator armatures 12, 12'.

The rotor yoke 10 includes a hollow shaft is integral thereon and fixedly mounted on the rotary shaft 4, and the yoke is flanked by a pair of the disk-shaped field magnets 13 and 13' each having N and S poles disposed symmetrically with respect to a diametral bisector of the disk. The magnets 13, 13' are attached on both sides of the rotor yoke 10 with the portions of the like poles disposed to face each other with the stator yoke interposed therebetween. The field magnets 13, 13' are positioned in face-to-face confronting relation to the stator armatures 12, 12' and rotatable relative thereto.

The cup-shaped housing 14 made of magnetic material is fixed at its open end to the stator yoke 11 in such a way that the above-mentioned motor component parts may be enclosed and protected thereby. On the bottom of the cup of the housing 14 are attached two coils 9'-1, 9'-2 constituting the second stator armature 12' and having similar shape and disposition to the coils 9-1, 9-2 of the first stator armature 12, respectively. If required, iron core may be provided in the armature coils 9'-1, 9'-2 as in the case of the coils 9-1, 9-2.

The disk-shape brushless type motor 6 thus constructed simply, with its armature coils disposed on opposite sides of the field magnets is advantageous over conventional brushless disk motors in that the former can dispense with the aforementioned device for detecting changes of magnetic poles, which is costly and difficult for application for the apparatus described herein because of the working ambient temperatures under which such apparatus operates, while maintaining the advantages of the latter conventional brushless type motor. It is apparent to those skilled in the art that, though two field magnets 13, 13' are provided on both sides of the rotor yoke 10 in the illustrated embodiment, only one field magnet may mounted on the rotary shaft 4.

Figure 2:
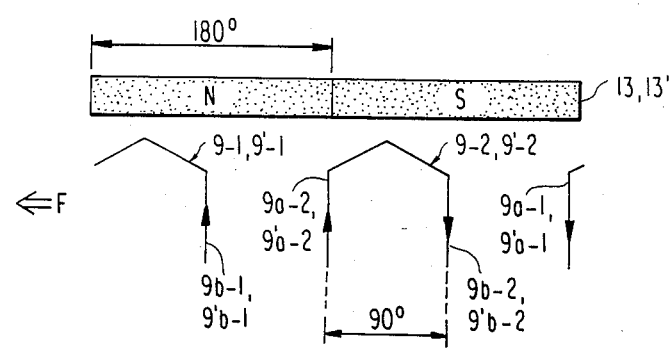
FIG. 2 is an illustrative expanded view showing positional relationship between a field magnet and its associated stator armature coils.

In order to effect a self-start of the motor 6 in a proper direction when it is energized, the stator armatures 12, 12' and the field magnets 13, 13' when the armature coils 9-1, 9-2, 9'-1, 9'-2 of the former are in de-energized state and, therefore, the throttle valve 3 is tilted to close the air passage 2 under the action of the return spring 5, are so disposed with respect to each other that torque is produced to rotate the magnets 13, 13' whenever the coils are energized, as illustrated in expanded diagram of FIG. 2.

Now referring to FIG. 2, it is clearly shown that the armature coils 9-1, 9-2, 9'-1, 9'-2 are so positioned in relation to the field magnets 13, 13' that when the coils are energized by excitation currents in a given direction (indicated by arrows) all the conductor portions 9a, 9b, 9'a, 9'b thereof can work effectively to develop the torque necessary to rotate the field magnets 13, 13', thus permitting a self-start of the motor 6. It in other words, the conductor portions 9a-1 and 9'a-1 of the armature coils 9-1 and 9'-1 are positioned so as to face the S-pole of their adjacent magnets 13 and 13', respectively; while the other conductor portions 9b-1 and 9'b-1 are disposed so as to face the N-pole of their adjacent magnets 13 and 13', respectively. Likewise, it is so arranged that the conductor portions 9a-1 and 9'a-2 of the field coils 9-2 and 9'-2 face the N-pole of their adjacent magnets 13 and 13', respectively; while the other conductor portions 9b-2 and 9'b-2 face the S-pole of their adjacent magnets 13 and 13', respectively. In this way, any of the conductor portions 9a-1, 9'a-1, 9a-2, 9'a-2, 9b-1, 9'b-1, 9b-2 and 9'b-2 act effectively to develop torque necessary for a start of the motor 6 when their armature coils 9-1, 9-2, 9'-1 and 9'-2 are excited. When a current flows in each of the armature coils in a direction as indicated by arrows, torque in a direction as shown by an arrow F is produced which causes the field magnets 13, 13' to rotate in directions F, accordingly.

Figure 3:
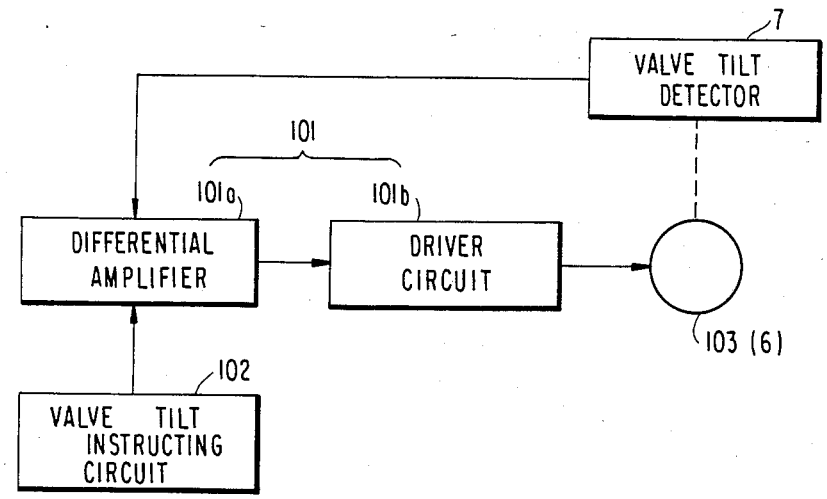
FIG. 3 is a block diagram showing schematically a control circuit for the motor constructed in accordance with the present invention.

Reference is then made to FIG. 3 showing a block diagram of a control system for the motor 6. In the control system, a signal representing the desired tilt of the throttle valve 3 is produced by means of circuit 102 for instructing a valve tilt, and another signal is developed by the valve tilt detecting device 7 adapted to detect the current tilt of the valve. These two signals are then transmitted to a differential amplifier 101a for comparison, whereupon a differential signal is produced by the amplifier. This control signal is fed to a driver circuit 101b which controls the operation of the motor 103 (6) according to the control signal so that the throttle valve 3 is driven to the desired tilt position. In the circuit, the differential amplifier 101a and the driver circuit 101b cooperate to form the motor control circuit 101.

As is apparent from the foregoing, when the air passage 2 is closed by the valve 3 which is then placed under the influence of the spring 5, no air is admitted through the passage. When any signal is issued from the valve tilt instructing means 102 and then fed to the control circuit 101, the latter energizes the armature coils 9-1, 9-2, 9'-1, 9'-2 and torque is created in the manner as described hereinbefore. Therefore, the field magnets 13, 13' are caused to rotate the desired amount while overcoming the action of the return spring 5, to cause the throttle valve to turn with the rotary shaft 4, with the result that the air passage 2 is opened accordingly, In this way, the flow of air through the air passage 2 is controlled by the throttle valve 3. Simultaneously, a feedback signal representing the rotation of the shaft 4, hence the current tilt of the throttle valve 3, is transmitted from the valve tilt detector 7 to the control circuit 101 so that the tilt of the throttle valve may be adjusted properly.

When it becomes desired to throttle off the air passage 2, the control circuit 101 is operated then to deenergize the armature coils 9-1, 9-2, 9'-1, 9'-2. Consequently, the throttle valve 3 is tilted back to its original "throttling" position by the return spring 5.

While in the above embodiment the armature coils 9-1, 9-2 and 9'-1, 9'-2 are spaced from each other at an equal distance, it is to be understood that they may be arranged otherwise without departing from the scope of the present invention, inasmuch as such arrangement can serve for the purpose. Furthermore, while the field magnets in the embodiment are formed circular disk or ring-shaped, they may be formed in segments, as well.

What is claimed is:

1. An electric motor operated throttle valve for an internal combustion engine comprising:
   a throttle valve (3) rotatably supported by a shaft (4), said valve disposed within air passage means (2) of an internal combustion engine and adapted to open and close the air passage, return spring means (5) urging said throttle valve to close the air passage means, and an electric motor connected operatively to said shaft to rotate said throttle valve in a direction which causes the air passage to open, said motor comprising;
   a rotatable shaft (15) integral with a rotor yoke (10), coaxial with and coupled directly to said shaft supporting said throttle valve;
   field magnetic means (13, 13') comprising at least one field magnet having one pair of N and S poles attached to said rotor yoke and axially aligned with said rotatable shaft; and
   stator armature means (12, 12') including two pairs of conductor windings disposed on opposite sides of said field magnetic means, each said pair of windings comprising a set of two conductor windings spaced apart from one another and face-to-face with said field magnetic means, said conductor windings each having conductor portions with an included angle greater than 90° and less than 180°, wherein said conductor windings are positioned relative to said N and S poles of said field magnet means so that when said windings are excited any conductor portions thereof can work effectively to develop torque to said motor.

2. Apparatus according to claim 1, wherein said filed magnet means has two magnets attached to opposite sides of said rotor yoke.

3. Apparatus according to claim 1, wherein said conductor windings include a flat-shaped coreless coil.

4. Apparatus according to claim 1, further comprising means for detecting the current tilt of said throttle valve, means for instructing the desired tilt of said throttle valve, and means operable in conjunction with said detecting means and said instructing means for controlling the operation of said motor.

* * * * *